April 7, 1931. G. D. HASKELL 1,799,812
MULTIPLE DRILL
Filed Sept. 21, 1925 2 Sheets-Sheet 2
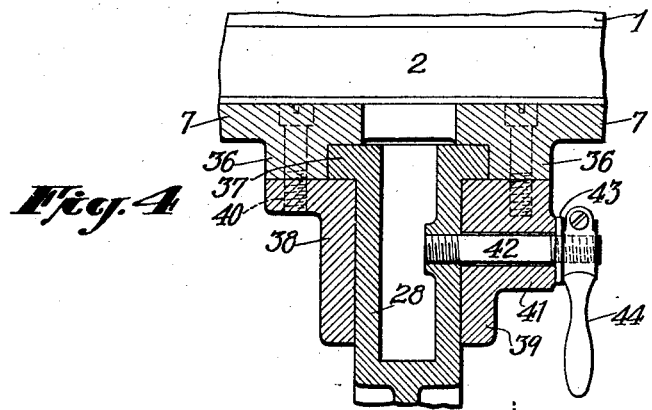
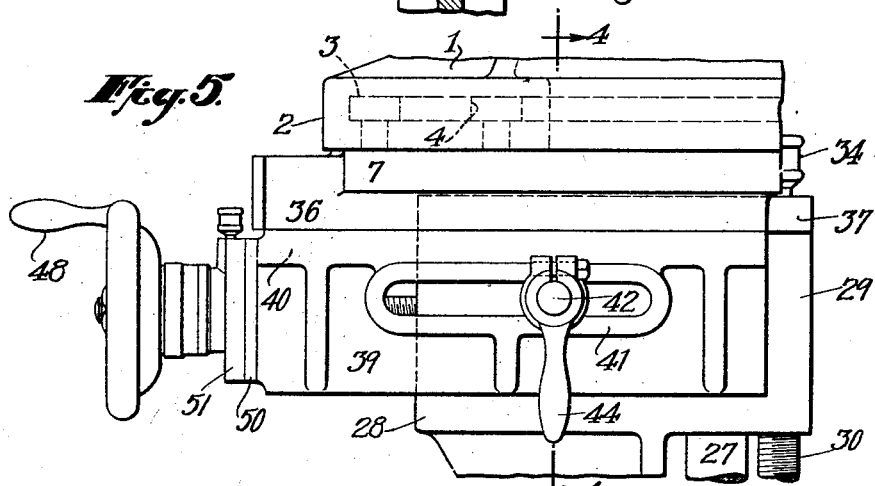
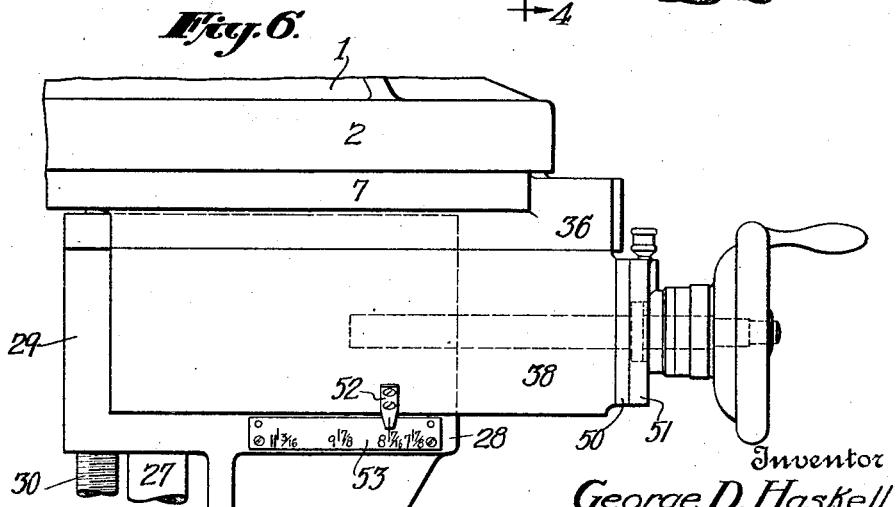
Inventor
George D. Haskell.
By His Attorney
D. Anthony Usina Patented Apr. 7, 1931

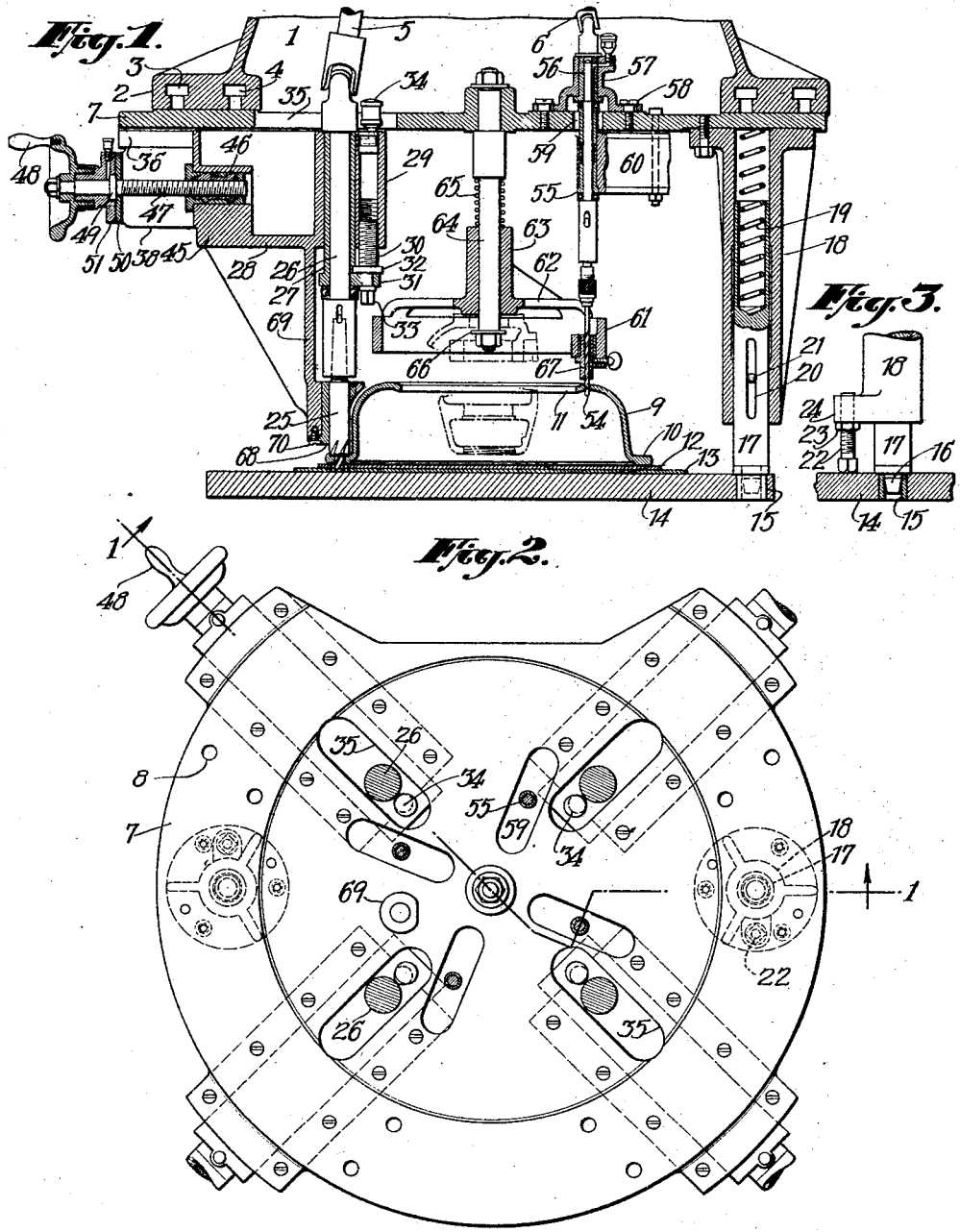

1,799,812

UNITED STATES PATENT OFFICE

GEORGE D. HASKELL, OF SPRINGFIELD, MASSACHUSETTS, ASSIGNOR TO BAUSH MACHINE TOOL COMPANY, OF SPRINGFIELD, MASSACHUSETTS, A CORPORATION OF MASSACHUSETTS

MULTIPLE DRILL

Application filed September 21, 1925. Serial No. 57,544.

The invention is directed to certain improvements which adapt the machine to the drilling of pipe flanges and similar circular work. The accompanying drawings illustrate an embodiment of the invention.

Fig. 1 is a vertical section approximately on the line 1—1 of Fig. 2;

Fig. 2 is a plan of the plate which carries the drills and related parts;

Fig. 3 is a detail in side elevation;

Fig. 4 is a vertical section approximately on the line 4—4 of Fig. 5;

Figs. 5 and 6 are opposite side elevations of a slide.

Referring to the drawings, there is illustrated at 1 the head of a standard type of multiple drills, surrounded at its edge by a flange 2 in which are T-shaped slots 3 and 4 to receive the heads of bolts which pass through the usual separate spindle-carrying arms and fasten the latter adjustably in place; the arms carrying at their inner ends spindles which have flexible driving connections with the driven shafts 5 and 6 of the machine. The invention may be used also in connection with various other styles of head.

The bearings for the drill spindles are supported from a plate 7 which is fastened to the face of the flange 2 by the usual bolts passing through holes 8 in the plate. The work in the case illustrated is an approximately tubular piece 9 with an outer flange 10 at its lower edge and an inner flange 11 at its upper edge. It rests on spacing plates 12 and 13 on a base 14. This base has two opposite sockets 15 adapted to receive the tapered end 16 of pins 17. As shown at the right of Fig. 1 each pin 17 is carried in a stiff tube 18 which is bolted at its upper end to the under face of the plate 7; the upper end of the pin being pressed down by a spring 19, and the movement of the pin being limited by a slot 20 engaging a small pin 21 transversely fixed in the tube. The tubes 18 being previously fastened to the plate 7, the latter is shifted about a vertical axis until the ends of the pins 17 enter the holes 15 and ensure the correct angular position for the apparatus; whereupon the plate 7 is clamped in this position to the head.

The tubes 18 also serve to limit the feed or movement of the drills into the work. At their lower ends they carry screws 22 (Fig. 3) the heads of which strike the base 14 to limit the downward movement. The screws thus constitute adjustable stops which are clamped by set nuts 23, the screws being threaded into lateral lugs 24 on the ends of the tubes 18. The adjustment of these stops is particularly important in limiting the depth of counter sinking or counterboring operations.

For boring the outer flange 10 of the work there are four drills 25 each being of two diameters, the smaller to bore through the work and the larger to form a shallow counterbore. Each of these drills is mounted in the lower end of a spindle 26 which rotates in a bearing 27 and has its upper end flexibly connected to one of the driving shafts 5. Each of the bearings 27 is mounted in a slide designated as a whole by the numeral 28 which is radially adjustable in relation to the axis of the drill head. The inner end 29 of each arm is vertically bored and internally threaded to receive at its lower end a screw 30 which is journalled in a lateral extension 31 of the bearing 27 and which has a collar 32 and a head 33 on opposite sides of the extension; so that by the screw 30 each spindle and drill may be adjusted up or down.

The heads of the spindles 26 and the projecting oil cups 34 extend upward through slots 35 in the plate 7. On the underside of the plate 7, as shown in Fig. 4, there are guides composed of pairs of flanges 36 grooved to receive flanges 37 at the upper edges of the slides 28. Each slide is held up by flanged bars 38 and 39, fastened to the flanges 36 by means of screws 40. The bar 39 is provided with a boss 41 (Fig. 5) with an elongated slot in which is located a clamping screw 42 screwing into a side wall of the slide 28 and having on its outer end a collar 43 bearing against the boss and a handle 44 by the turning of which the slide will be clamped or locked in its position of radial adjustment.

Each slide 28 has an end wall 45 in which is fastened a nut 46 (Fig. 1) through which is threaded an adjusting screw 47 having on its outer end a crank 48 and a collar 49 bearing between an inner plate 50 and a similar outer plate 51; these two plates being fast to the ends of the side bars 38 and 39, (Fig. 4) so that the turning of the screw 47 in one direction or the other will force the slide inward or outward.

On the lower edge of the bar 38 (Fig. 6) is a pointer 52 registering with a scale plate 53 set in the adjacent portion of the slide 28 projecting below the bar. With the aid of this scale the drills may be adjusted to the desired radial spacing.

The machine is also provided with four smaller drills 54 (Fig. 1) for the inner flanges of the work, these being set in the lower ends of bearings 55 and being driven at their upper ends by squared engagement with heads 56 which have flexible connections with driving shafts 6. The heads 56 are journalled in bearings 57 which are fastened on the plate 7 by means of screws 58 passing through slots in the flange of the bearing so as to permit radial adjustment; the spindle bearings 55 passing up through radial slots 59 (Fig. 2) in the plate.

The bearings 55 are supported laterally by arms 60 similar to the usual spindle carrying arms of multiple drills and fastened in the usual way to the plate 7 which is bolted to the head.

Preferably also means are provided for guiding the lower ends of the drills 54. A ring 61 is connected by arms 62 to a long sleeve 63 on a rod 64 which is rigidly fastened to the plate 7. A spring 65 presses the slide and ring down but permits it to yield upward to any obstacle presented by the shape of the central portion of the work; a flanged nut 66 preventing the sleeve from escaping at the lower end of the rod. At intervals around the ring 61 bearings 67 are fastened in place to receive the drill and brace it against lateral displacement. For work of different radial spacing, rings 61 of appropriate sizes will be used, these being readily removed and replaced by removing the nut 66 and sliding them off or on the rod 64. Similarly different rings may be used for different circumferential spacing; or, in fact, for irregular arrangement of the drills, the slots and connections to the plate 7 being modified accordingly.

The outer drills 25 are also braced at their lower ends by means of sleeves 68 fitting in internal projections from the lower ends of braced legs 69 extending downward from the slides 28, the sleeves being fastened by screws 70.

The boss 69, Fig. 2, takes a guide pin for locating the inner jig or ring 61.

The invention is shown applied to a vertical machine of common type. But it may be applied to various other multiple drill machines with advantage. The radial adjustments may be effected by screws as illustrated for the outer drills, or by various other devices or even by hand. The construction and arrangement of the slides may be considerably varied. And various other changes may be made by those skilled in the art without departing from the invention as defined in the appended claim.

What I claim is:

The combination with the head of a multiple drill machine carrying driven shafts for driving the drill spindles, of a detachable fixture including slides adjustable inward and outward adapted to carry the upper portions of the spindles and having forward extensions bracing the ends of the drills.

In witness whereof, I have hereunto signed my name.

GEORGE D. HASKELL.